(12) United States Patent
Giulianelli

(10) Patent No.: US 6,636,521 B1
(45) Date of Patent: Oct. 21, 2003

(54) FLEXIBLE RUNTIME CONFIGURABLE APPLICATION PROGRAM INTERFACE (API) THAT IS COMMAND INDEPENDENT AND REUSABLE

(75) Inventor: Danilo Giulianelli, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/215,241

(22) Filed: Dec. 18, 1998

(51) Int. Cl.[7] .............................................. H04L 12/54
(52) U.S. Cl. ...................................................... 370/407
(58) Field of Search ................................ 370/351, 352, 370/407, 401, 402, 403, 395.2, 395.31, 395.32, 395.21, 395.41, 428, 389, 399, 465, 466, 467, 468; 705/14; 709/223, 230, 224, 249, 217, 250; 713/201; 717/121, 102, 120

(56) References Cited

U.S. PATENT DOCUMENTS

| | | | | |
|---|---|---|---|---|
| 5,088,090 A | * | 2/1992 | Yacoby | 370/408 |
| 5,214,646 A | * | 5/1993 | Yacoby | 370/402 |
| 5,490,139 A | * | 2/1996 | Baker et al. | 370/408 |
| 6,163,543 A | * | 12/2000 | Chin et al. | 370/216 |
| 6,335,927 B1 | * | 1/2002 | Elliott et al. | 370/352 |

* cited by examiner

*Primary Examiner*—Dang Ton (57) ABSTRACT

An application program interface capable of routing commands received from external devices to the appropriate system application that is runtime configurable is disclosed. At runtime, the application program interface receives enrollment signals from external interface packages used to provide communications to the external devices and dynamically updates a first routing table. Additionally, at runtime, the application program interface receives enrollment signals from system application packages used to perform system commands and dynamically updates a second routing table. The routing tables are used to route command request and responses between the external interface and system application packages and thus, provides a communication interface between external devices and system application software. Since the routing tables are configured at runtime, the application program interface can be re-configured without re-compiling the software used to implement it. In addition, since the routing is performed without specific knowledge of the number and content of the command requests and responses, the application program interface provides communications between the external devices and system application software that is command independent.

49 Claims, 6 Drawing Sheets

FLEXIBLE RUNTIME CONFIGURABLE APPLICATION PROGRAM INTERFACE (API) THAT IS COMMAND INDEPENDENT AND REUSABLE

BACKGROUND OF THE INVENTION

1. Field of the Invention

The present invention relates to the field of telecommunications systems and, more particularly to a flexible, runtime configurable, application program interface (API) that is command independent and reusable.

2. Description of the Related Art

Embedded software is software that is part of a larger system which is used to perform some of the operations of that system. Typically, the use of embedded software is transparent to the end user of the system containing the software.

Today, real-time embedded software is used in many products and devices particularly in the telecommunications and data access fields. The term embedded system will be used herein to refer to a system, device or product utilizing real-time embedded software. Real-time embedded software is typically used to interface the embedded system with numerous external devices. In most situations, the external devices will request the embedded system to perform a system operation by transmitting a command request message over an interface connected to the embedded system. Thus, the embedded software must be capable of responding to command requests received over a number of different external interfaces. In a telecommunications system, for example, these commands would be used for provisioning data, system configuration, fault, security and performance management as well as other system functions.

Typically, the real-time embedded software will include individual software applications that are used to perform the operations of the system (also collectively referred to herein as "system application software"). Accordingly, when an external device requests that a system operation be performed, a software application corresponding to the requested operation will be invoked. A system capable of performing numerous operations will typically contain numerous software applications to carry out these operations.

A command router is one component of the real-time embedded software that is generally used as a gateway between the external interfaces and the system application software. That is, the command router serves as a common application program interface between the various external devices, and their unique communication protocols, and the system application software. The command router will be able to receive, interpret and route command requests from the external interfaces to the appropriate software application. In addition, the command router will be able to receive, interpret and route status and other information from the software applications over the appropriate external interfaces.

The external devices must know what operations are being implemented by the system. In addition, the external devices must know the command format and parameters required by the system application software to properly request the execution of an operation. The command router provides the path for communications between the external devices and application software and thus, the command router must know the number of external interfaces and software applications within the system and how to route the command requests and responses. Therefore, all of the commands, command parameters, software applications, external devices and the configuration of the command router must be known when the real-time embedded software is compiled. Any system changes, such as the altering of command parameters or the removal of an operation from the system, require the re-configuration and re-compiling of the embedded software. This is undesirable since it takes time to both re-compile and implement the new software into the system. Accordingly, there is a desire and need for a command router that may be re-configured without re-compiling the software.

As stated above, the system may be capable of performing numerous operations and thus, the external devices will be capable of commanding the execution of these operations. The command router would be required to know how to route each command request and its response. It would be desirable, however, if the command router were designed to provide an interface between the external devices and application software without specific knowledge of the number and content of the command requests and responses. That is, there is a desire and need for a command router providing communications between external devices and application software that is command independent.

SUMMARY OF THE INVENTION

The present invention provides an application program interface that may be re-configured without re-compiling the software used to implement the application program interface.

The present invention also provides an application program interface providing communications between external devices and application software that is command independent.

The above and other features and advantages of the invention are achieved by providing an application program interface capable of routing commands received from external devices to the appropriate system application that is runtime configurable. At runtime, the application program interface receives enrollment signals from external interface packages used to provide communications to the external devices and dynamically updates a first routing table. Additionally, at runtime, the application program interface receives enrollment signals from system application packages used to perform system commands and dynamically updates a second routing table. The routing tables are used to route command request and responses between the external interface and system application packages and thus, provides a communication interface between external devices and system application software. Since the routing tables are configured at runtime, the application program interface can be re-configured without re-compiling the software used to implement it. In addition, since the routing is performed without specific knowledge of the number and content of the command requests and responses, the application program interface provides communications between the external devices and system application software that is command independent.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Figure 1:
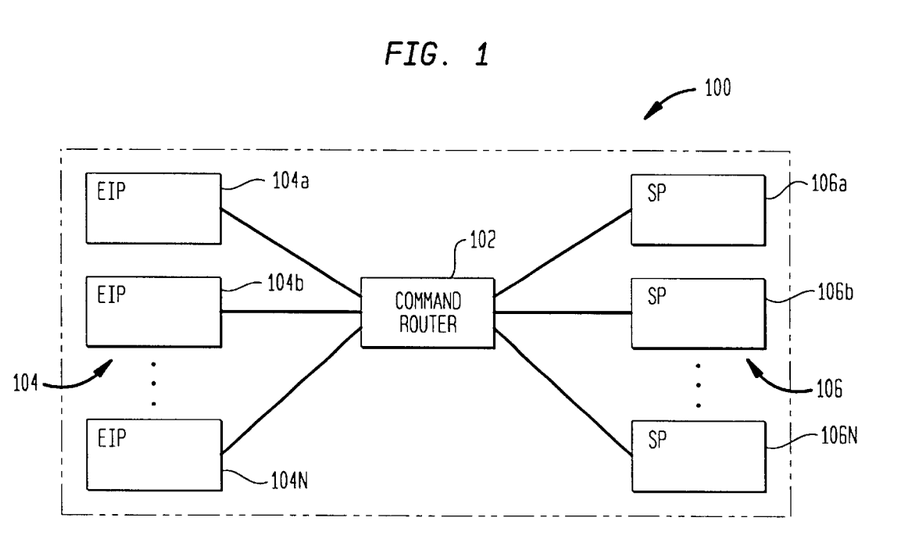
FIG. 1 illustrates a functional block diagram of a system utilizing the application program interface constructed in accordance with the present invention.

FIG. 1 illustrates a functional block diagram of a system 100 utilizing a command router 102 constructed in accordance with the present invention. As stated earlier, the command router 102 serves as an application program interface between external devices and system application software. The system 100 includes a set of external interface packages (EIPs) 104a, 104b . . . 104n (collectively referred to herein as "external interface packages 104" or "EIPs 104") and a set of system application packages 106a, 106b . . . 106n (collectively referred to herein as "system application packages 106" or "SPs 106").

The external interface packages 104 and the system application packages 106 communicate with the command router 102 through a service access point interface (not shown). As is known in the art, the Open Systems Interconnection (OSI) standard governs the logical structure of communication networks. The OSI standard uses service access points or "SAPs" to identify where a designated network service may be obtained. The service access points are typically identified by a name or number which, as will be described in detail below, will be used by the command router 102 to route information to the appropriate EIP 104 or SP 106. Current software development packages provide a means for implementing a service access point interface and accordingly, the details of the interface and its implementation will not be described further.

The external interface packages 104 are used to help the command router 102 to properly communicate with the external devices connected via an external interface (not shown). Since the external devices and their corresponding interfaces utilize varying communication protocols, an internal communication format is used to communicate between the external interface packages 104 and the command router 102. Therefore, each external interface package 104 will be able to terminate the external protocol, convert received messages to the internal message format and then send the message to the command router 102. Likewise, each external interface package 104 will be able to receive messages from the command router 102, convert the internal message to the appropriate external interface message format and then send the message over the external interface to the external device. There will be one external interface package 104 for every external interface connected to the system 100. As will be discussed below, command requests received from the external interface packages 104 will be sent to the command router 102 which in turn routes the command request to the system application package 106 responsible for executing the requested command.

The system application packages 106 are software applications used to perform the system operations needed to implement the requested command. Each system application package 106 will be able to communicate with the command router 102 using the internal message format. Each system application package 106 will be able to receive a message from the command router 102, perform the necessary system operations and then send a response message to the command router 102. Typically, there will be at least one system application package 106 for every possible command request. It must be noted, however, that there can be more than one system application package 106 per command or there can be a system application package 106 capable of performing more than one command if so desired.

The command router 102 will be compiled without any specific knowledge of the system 100 configuration and routing information. In order for the command router 102 to know how to route the command requests received from an external interface package 104 to the correct system application package 106, the command router 102 will maintain two routing tables that are built at runtime. The first routing table will be used to correlate external interface packages 104 with their service access points connected to the command router 102. Accordingly, the first routing table will be referred to herein as the EIP routing table. The second routing table will be used to correlate system application packages 106 and the commands that they will support with their service access points connected to the command router 102. Accordingly, the second routing table will be referred to herein as the SP routing table. Both the EIP and SP routing tables will be built at runtime by dynamic enrollment (described below with references to FIGS. 3 and 4). Once the routing tables are built, the command router 102 uses these tables to properly route command requests and responses between the external interface packages 104 and system application packages 106 (described below with reference to FIGS. 5 and 6).

It must be noted that the command router will be capable of performing external interface package enrollment, system application package enrollment, command request and command response processing as described below with references to FIGS. 3–6. It must be noted that these processes are preferably initiated in a parallel manner, but that they could be initiated sequentially or in any other suitable manner. In addition, the command router may also perform other processing, such as auditing, command termination, error handling and that the invention is not to be limited to the particular processing described herein.

Figure 3:
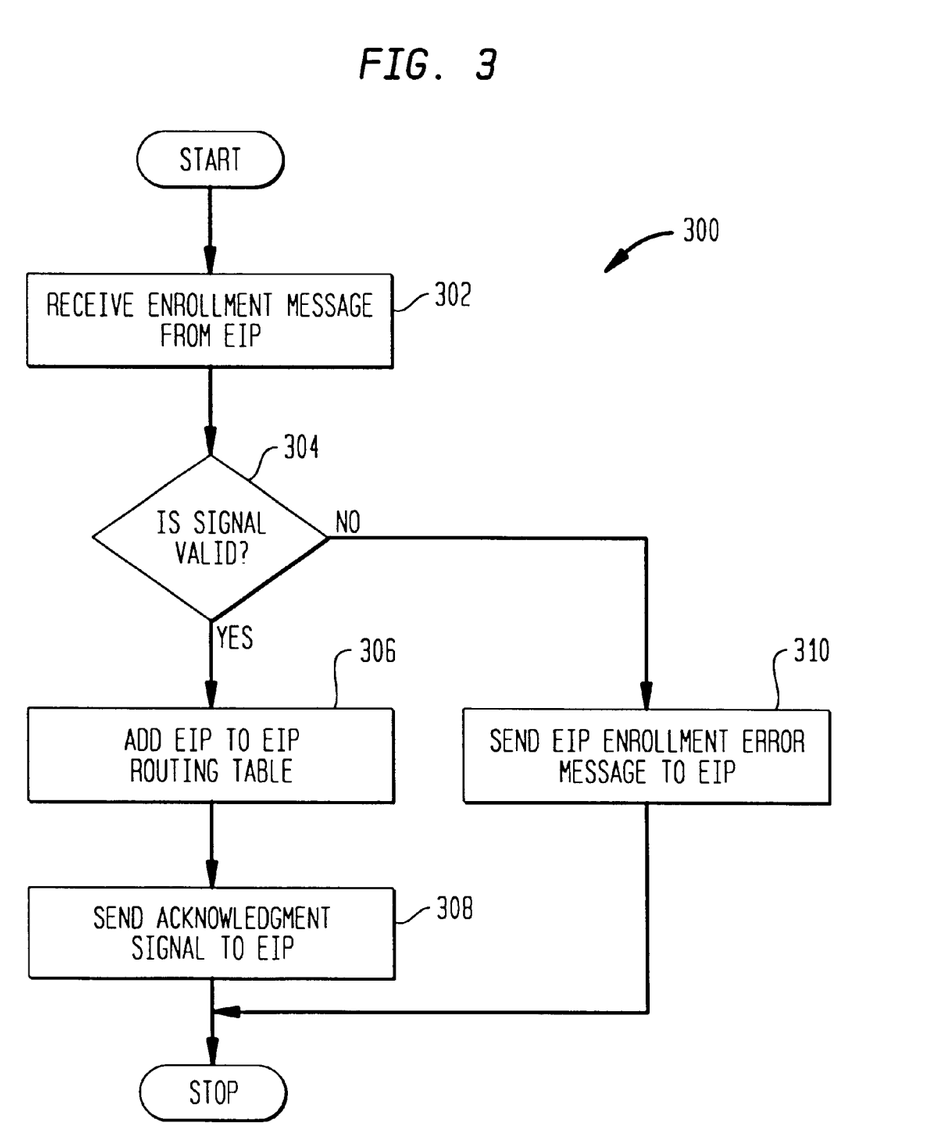
FIG. 3 illustrates an exemplary external interface package enrollment processing performed by the application program interface of the present invention.

FIG. 3 illustrates an exemplary external interface package enrollment processing 300 performed by the command router of the present invention. At runtime, the command router will not have any information concerning the number, names and service access points of the external devices and their corresponding external interface packages. Therefore, prior to passing a command request to the command router, every external interface package must enroll with the command router to identify itself. To do so, each external interface package must send an enrollment message to the command router. Thus, the command router's first step in the enrollment process 300 is to receive an enrollment message from one of the external interface packages (step 302).

In step 304, the command router determines if the received EIP enrollment message is valid. To be valid, the EIP enrollment message must contain at least the name of the external interface package transmitting the enrollment message. If the message is valid, the process continues at step 306 where the external interface package is added to the EIP routing table. This is performed by inserting the service access point the EIP enrollment message was received over into the EIP routing table. The name of the external interface package is used as an index into the table. Therefore, to route messages to a particular external interface package, the command router merely needs the name of the external interface package since the service access point is obtainable from the EIP routing table (as will be described below). The external interface packages will always include their names in any messages to the command router and thus, the external interface package name will be available to the command router and system application packages.

Once the EIP routing table has been updated, an acknowledgment message can be sent to the external interface package that has just enrolled with the command router (step 308). This step is optional, but is preferred since it gives the external interface package notice that the enrollment was successfully completed. The processing 300 is complete.

If the enrollment message is invalid, that is, the external interface package name was not included within the message, the process continues at step 310 where an EIP enrollment error message is sent to the enrolling EIP. The processing 300 is complete. It must be noted that the processing 300 could perform additional error checking such as preventing an external interface package name from being used for more than one enrollment. It must be noted that an external interface package can be unenrolled in a manner similar to the enrollment processing 300 (with the exception that the service access point corresponding to the external interface name is removed from the EIP routing table). It must be noted that the processing 300 is repeated for every external interface package which wishes to use the command router to access system application packages. This may be done as part of an initialization process for each external interface package, that is, when they become operational, or prior to its first command request. In addition, the external interface packages do not have to enroll at the same time. It must be noted that the processing 300 uses the name of the EIP to access the EIP routing table, but it should be appreciated that a number or other method of identification can be used.

Figure 4:
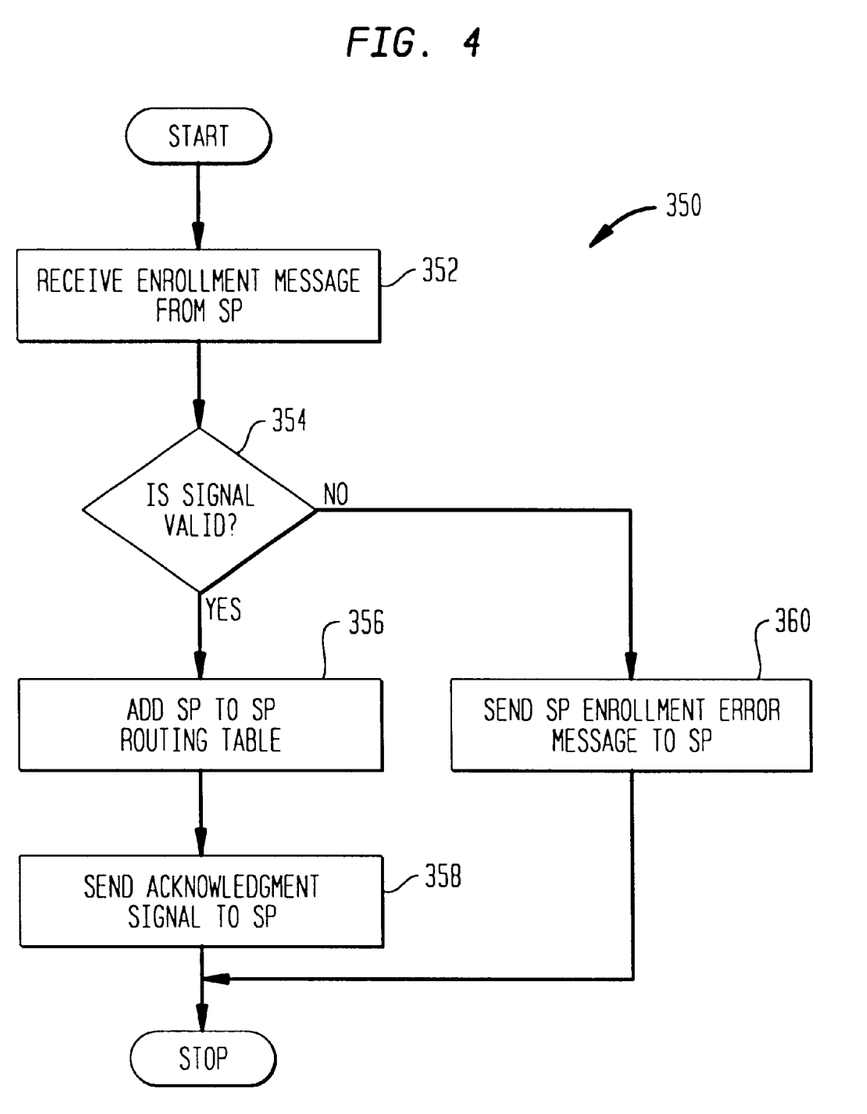
FIG. 4 illustrates an exemplary system application package enrollment processing performed by the application program interface of the present invention.

FIG. 4 illustrates an exemplary system application package enrollment processing 350 performed by the command router of the present invention. At runtime, the command router will not have any information concerning the number, names and service access points of the system application packages and the commands they perform. Therefore, before the command router passes a command request to a system application package, the system application package must enroll with the command router to identify itself. To do so, each system application package must send an enrollment message to the command router. Thus, the command router's first step in the system application package enrollment process 350 is to receive an enrollment message from one of the system application packages (step 352).

In step 354, the command router determines if the received SP enrollment message is valid. To be valid, the SP enrollment message must contain the command name the system application package will support and the command parameters required to implement the command. If the message is valid, the process continues at step 356 where the command name is added to the SP routing table. This is performed by inserting the service access point the SP enrollment message was received over into the SP routing table. The name of the command the system application package supports is used as an index into the SP routing table. Therefore, to route command request messages to the appropriate system application package, the command router merely needs the name of the command being requested since the service access point is obtainable from the SP routing table (as will be described below). The external interface packages will always include the command name being requested (as well as its name for any command responses) in any command request messages sent to the command router.

Once the SP routing table has been updated, an acknowledgment message can be sent to the system application package that has just enrolled with the command router (step 358). This step is optional, but is preferred since it gives the system application package notice that the enrollment was successfully completed. In addition, another optional step would be to broadcast the newly enrolled command information to all of the enrolled external interface packages so that they will have information concerning the command syntax and its parameters. This allows the external interface packages to receive indirectly from the system application packages all of the information necessary to parse, validate, populate, decipher the command to be executed and its response without recompiling the external interface package software.

It must be noted that the system application package enrollment processing 350 can be modified such that one system application package can support more than one command. To do so, the SP enrollment message would include all of the command names and parameters that the system application package will support. In addition, the processing 350 can be modified such that more than one system application package can support the same command if so desired. To do so, the SP enrollment message can include an access identifier ("access ID") which can be used as a secondary index into the SP routing table since the command name would have more than one entry in the table.

If the enrollment message is invalid, that is, the command name or parameters were not included within the message, the process 350 will continue at step 360 where a SP enrollment error message is sent to the enrolling system application package. The processing 350 is complete after this step. It must be noted that the processing 350 could perform additional error checking such as preventing the same command name/access ID pair from being used for more than one enrollment (or if the access ID is not used, the processing 350 can prevent the same command name from being used for more than one enrollment).

It must also be noted that the processing 350 could allow the enrollment of one or multiple system application packages for the same command name/access ID pair if desired. This would allow the command router to send command execution request messages in parallel to all of the enrolled system application packages supporting a particular command to balance the load among the system application packages. This is useful when the same system operation can be processed in parallel, such as retrieving the status of the system, and multiple external interface packages could request the operation at the same time. Thus, multiple system application packages can enroll to support this system operation so that multiple external interface packages can be serviced at the same time if so desired.

It must be noted that a command name can be unenrolled in a manner similar to the enrollment processing 350 (with the exception that the service access point corresponding to the command name is removed from the SP routing table). It must be noted that the processing 350 is repeated for every system application package which wishes to enroll the commands they support with the command router. This may be done as part of an initialization process for each system application package, that is, when they become operational, or when the command they support is functional. In addition, the system application packages do not have to enroll at the same time. It must be noted that the processing 350 uses the command name to access the SP routing table, but it should be appreciated that a number or other method of identification can be used.

Figure 5:
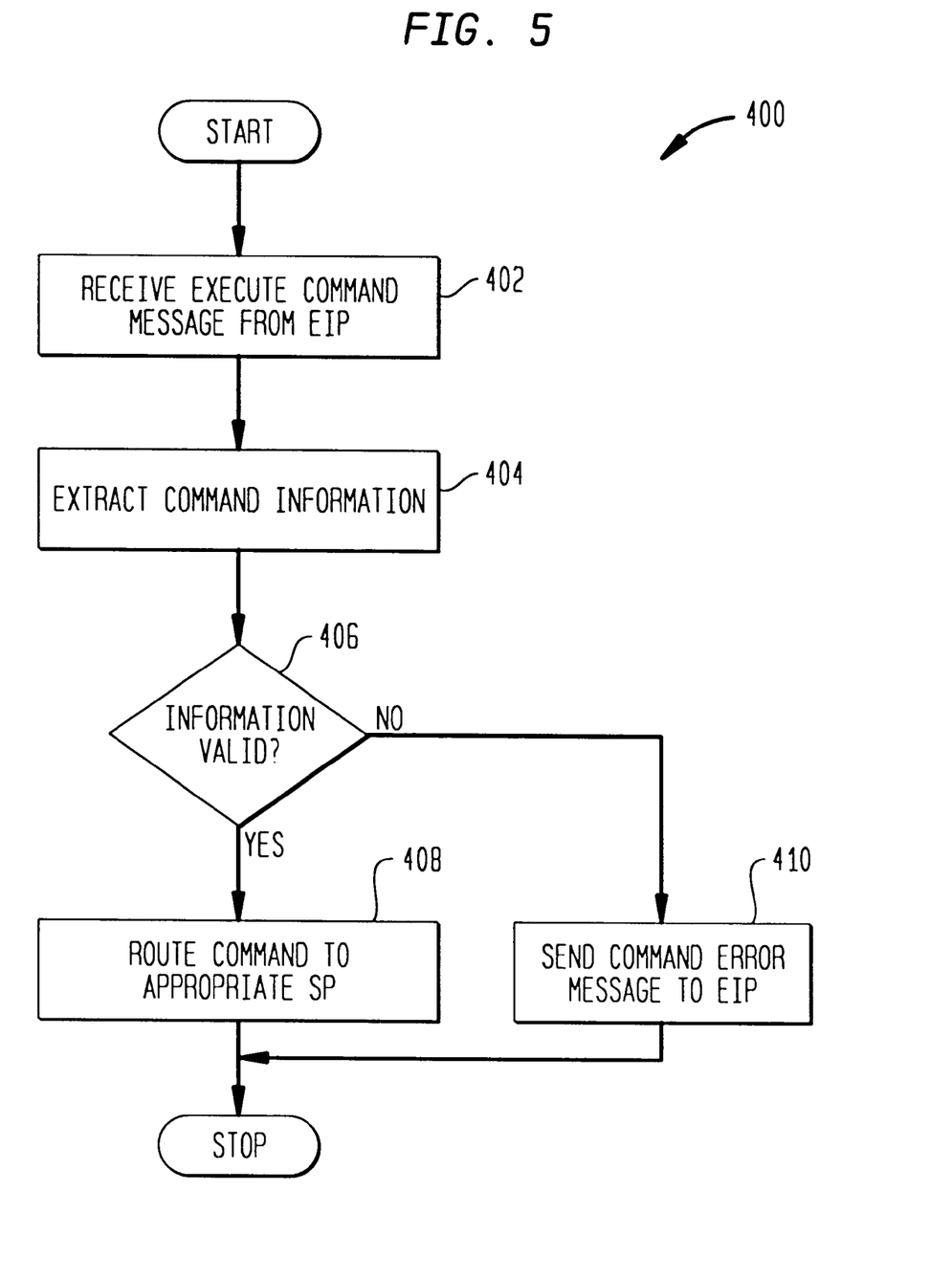
FIG. 5 illustrates an exemplary command request processing performed by the application program interface of the present invention.

FIG. 5 illustrates an exemplary command request processing 400 performed by the command router of the present invention. Command request messages will be sent to the command router from the external interface packages. Thus, the command router's first step in the command request processing 400 is to receive a command request message from one of the external interface packages (step 402). The command router will then extract the requested command name from the message (step 404).

In step 406, the command router determines if the information within the received command request message is valid. To be valid, the command request message must contain the name of the command requested and the SP routing table must have an entry corresponding to that command name. If the command request message is valid, the process continues at step 408 where the command router routes the command request message to the appropriate system application package via the service access point retrieved from the SP routing table. As stated above, there could be more than one system application package supporting the requested command. If this is the case, the command router will use the access ID found within command request message to obtain a specific system application package. In addition, the command router can choose a system application package itself by keeping track of the system application packages capable of handling the requested command and whether they are currently processing a command request. Once the command request message has been sent to the appropriate system application package, the processing 400 is complete.

It must be noted that the format of the command request message, and all of the messages passed between the external interface packages and the system application packages, preferably includes a header portion and a data portion. The header portion contains only the command name, access ID (if used) and any other information required to route the message to the correct system application program. The data portion contains all of the command specific parameters required by the system application program to execute the command. The data portion is passed as is and is not interpreted or inspected by the command router. Thus, the command router is command independent since it does not need to know what the command specific parameters are to implement the command request message. The same holds true for other messages, such as a command response message sent from a system application package to an external interface package (described below with reference to FIG. 6), as long as the header portion contains the information necessary to route the message.

In addition, it must be noted that the routing performed by the command router is weighted based upon the presence or absence of the access ID. For example, if two system application packages, SP_1 and SP_2 are capable of supporting the same command, but only SP_1 has enrolled with a specific access ID ACC_ID_1, then a command request message containing ACC_ID_1 will only be routed to the first system application package SP_1. Command request messages not containing the specific access ID ACC_ID_1 can be routed to either SP_1 or SP_2.

If the information within the command request message is invalid, that is, either the command name was missing from the command request message or the SP routing table did not have an entry corresponding to that command name, the processing 400 continues at step 410 where a command request error message is sent to the requesting EIP.

Figure 6:
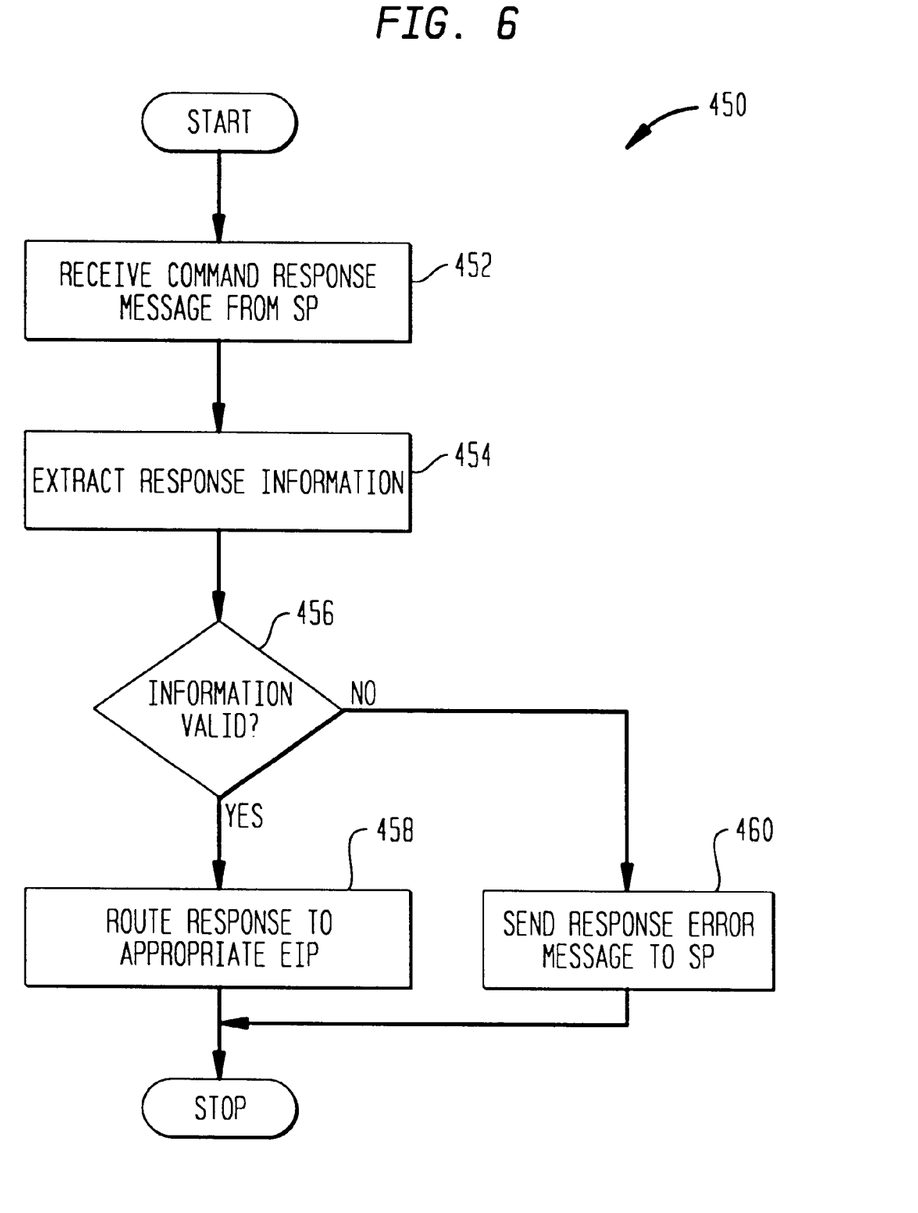
FIG. 6 illustrates an exemplary command response processing performed by the application program interface of the present invention.

FIG. 6 illustrates an exemplary command response processing 450 performed by the command router of the present invention. Command response messages will be sent to the command router from the system application packages. Thus, the command router's first step in the command response processing 450 is to receive a command response message from one of the system application packages (step 452). The command response message will include information about the executed command and will also contain the name of the external interface package that requested the command. The external interface package that originally requested the command will be the recipient of the command response from the system application package. The command router will then extract the external interface package name from the command response message (step 454).

In step 456, the command router determines if the information within the received command response message is valid. To be valid, the command response message must contain the name of an external interface package and the EIP routing table must have an entry corresponding to that name. If the message is valid, the processing 450 continues at step 458 where the command router routes the command response message to the appropriate external interface package via the service access point retrieved from the EIP routing table. Once the command response message has been sent to the appropriate external interface package, the processing 450 is complete.

If the information within the command response message is invalid, that is, either the external interface name was missing from the command response message or the EIP routing table did not have an entry corresponding to that name, the processing 450 continues at step 460 where a command response error message is sent to the system application package transmitting the command response message.

Since the routing tables of the command router of the present invention are configured at runtime, the command router does not need to know the number of external interfaces and software applications within the system and how to route the command requests and responses when its software is compiled. Therefore, any system changes, such as the altering of command parameters or the removal of an operation from the system, will not require the re-configuration, re-compiling, downloading and execution of the command router and the remainder of the embedded software.

In addition, the command router allows command names to dynamically enroll and unenroll. This is particularly useful when the state of the system changes and some commands are no longer necessary or would require different parameters to execute the operations on the system while it is in the altered state. It must be noted that the system application packages and external interface packages need to be re-compiled to implement the enrollment or unenrollment of commands.

It must also be noted that new external devices could be added to the system if an external interface package for that external device already existed within the software build and was capable of being initiated when the external device was "plugged" into the system. When the external device is plugged in, its external interface package would send and EIP enrollment message to the command router and thus, a new device would be added to the system without re-configuring, re-compiling, downloading and execution of the software.

Figure 2:
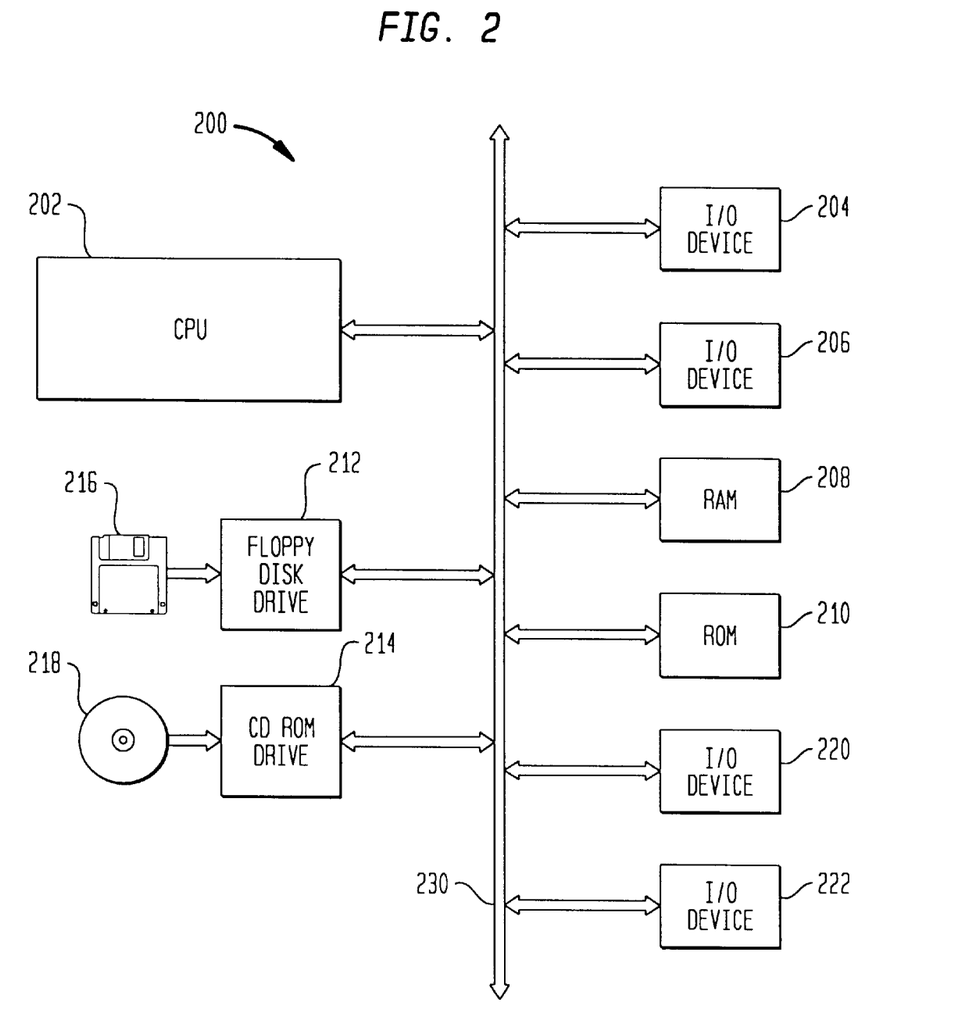
FIG. 2 illustrates an exemplary processor based system for implementing the application program interface of the present invention.

FIG. 2 illustrates an exemplary processor based system 200 for implementing the command router of the present invention. The processor based system 200 includes a central processing unit (CPU) 202 that communicates with an input/output (I/O) device 204 over a bus 230. Additional I/O devices 206, 220, 222 are illustrated, but are not necessary. The processor based system 200 also includes random access memory (RAM) 208, read only memory (ROM) 210, and may include peripheral devices such as a floppy disk drive 212 and a compact disk (CD) ROM drive 214 which also communicate with the CPU 202 over the bus 230. It must be noted that the exact architecture of the processor based system 200 is not important and that any combination of computer compatible devices may be incorporated into the system 200 as long as the command router of the present invention can be implemented on the system 200 as described below with references to FIGS. 3–6. Moreover, the program for CPU 202 which causes it to implement the command router of the present invention may be stored in RAM 208, ROM 210, CD-ROM 218, floppy disk 216, a hard drive or any other medium capable of storing a program. During execution of the program it will be loaded into the RAM 208. All of these devices communicate with CPU 202 as is well known in the art.

Preferably, the command router of the present invention is suitable for use with a telecommunications or data access device. It must be noted, however, that the command router of the present invention can be used for other applications requiring the interfacing of system application software and external devices and should not be limited solely to telecommunication and data access devices. It should be appreciated that the command router is not to be limited to the routing of solely command requests and responses and that the router is capable of routing other messages and signals. In addition, the command router can be used to route information between external interface packages and between system application packages if it is so desired. It must also be noted that one routing table having entries for both commands and external interfaces can be used by the command router of the present invention.

It must be noted that the command router of the present invention is implemented as a program which gets executed on a processor based system (e.g., system 200 illustrated in FIG. 2). It must be noted that the command router, external interface packages and system application programs do not have to reside on the same processor. The invention can be written in different computer languages for different processor based systems. The present invention can be stored on a hard drive, floppy disc, CD-ROM or other permanent or semi-permanent storage medium. The program embodying the present invention can also be divided into program code segments, or it can be downloaded, for example, from a server computer, or transmitted as a data signal embodied in a carrier wave as is known in the art.

Although the command router of the present invention is preferably implemented as a program which gets executed on a processor based system it should be understood, however, that one or more of the operations described may also be carried out in an equivalent manner by a special purpose computer, logic circuits or hardware circuits. Thus, one or more portions of the invention may be performed with hardware, firmware, software or any combination of these.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer implemented method of routing information between at least one commanding device and at least one commanded device, said method comprising:

enrolling the at least one commanding device in at least one enrollment table;

enrolling the at least one command device in said at least one enrollment table;

using said at least one enrollment table to route information between an enrolled commanding device and an enrolled commanded device;

wherein said step of enrolling a commanding device comprises:

receiving a first enrollment message from said commanding device;

entering routing information contained in said first enrollment message into said enrollment table; and determining a service access point from which said first enrollment message was received and entering said service access point in said enrollment table so as to identify the device to which the information is to be routed.

2. A method of receiving a predetermined computer code, said method comprising:

receiving said predetermined computer code over a communications link and storing said predetermined computer code on a storage device, said predetermined computer code being executable by a processor to perform the functions of:

enrolling at least one commanding device in at least one enrollment table;

enrolling at least one commanded device in said enrollment table; and using said enrollment table to route information between the controlled commanding device and the enrolled commanded device;

wherein said step of enrolling a commanding device comprises:

receiving a first enrollment message from said commanding device;

entering routing information contained in said first enrollment message into said enrollment table; and determining a service access point from which said first enrollment message was received and entering said service access point in said enrollment table so as to identify the device to which the information is to be routed.

3. The method of claim 1 further comprising the steps of:

receiving additional first enrollment messages from other commanding devices that have not been enrolled into said enrollment table; and entering routing information contained in said additional first enrollment messages into said enrollment table.

4. The method of claim 3 further comprising the steps of:

receiving a second unenrollment message from an enrolled commanding device; and removing said enrolled commanding device and sending said second enrollment message from said enrollment table.

5. The method of claim 1 wherein the step of entering routing information contained in said first enrollment message into said enrollment table comprises the steps of:

validating said first enrollment message;

extracting an interface name from said validated first enrollment message; and entering said service access point into said enrollment table in a location corresponding to said interface name.

6. The method of claim 5 further comprising the step of sending an error message to said commanding device if said first enrollment message is invalid.

7. The method of claim 1 wherein the step of enrolling at least one commanded device comprises:

receiving a first enrollment message from a commanded device; and entering routing information of said first enrollment message into said enrollment table.

8. The method of claim 7 further comprising the steps of:

receiving additional first enrollment messages from other commanded devices that have not been enrolled into said enrollment table; and entering routing information contained in said additional first enrollment messages into said enrollment table.

9. The method of claim 8 further comprising the steps of:

receiving a second unenrollment message from an enrolled commanded device; and removing said commanded device and sending said second unenrollment message from said enrollment table.

10. The method of claim 9 further comprising the steps of:

receiving another first enrollment message from a commanded device that was removed from said enrollment table; and entering routing information contained in said additional first enrollment message into said enrollment table.

11. The method of claim 10 further comprising the step of routing information corresponding to said enrolled commanded device corresponding to said another first enrollment message to said enrolled commanding device.

12. The method of claim 7 wherein said commanded device is a software application supporting system commands and said step of entering routing information contained in said first enrollment message into said enrollment table comprises the steps of:

determining a service access point from which said first enrollment message was received;

validating said first enrollment message;

extracting a command name from said validated first enrollment message; and entering said service access point into said enrollment table in a location corresponding to said command name.

13. The method of claim 12 further comprising the step of sending an error message to said software application if a first enrollment message received from said software application is invalid.

14. The method of claim 1 further comprising the step of sending an acknowledgment message to an enrolled commanding device.

15. The method of claim 1 further comprising the step of sending an acknowledgment message to an enrolled commanded device.

16. The method of claim 1 wherein said at least one enrollment table comprises a first routing table for enrolling said commanding devices and a second routing table for enrolling said commanded devices.

17. A computer readable storage medium containing a computer readable code for operating a computer to perform a method of routing information between at least one commanding device and at least one commanded device, said method comprising:

enrolling at least one commanding device in at least one enrollment table;

enrolling at least one commanded device in said enrollment table; and using said enrollment table to route information between the enrolled commanding device and the enrolled commanded device;

wherein said step of enrolling a commanding device comprises:

receiving a first enrollment message from said commanding device;

entering routing information contained in said first enrollment message into said enrollment table; and determining a service access point from which said first enrollment message was received and entering said service access point in said enrollment table so as to identify the device to which the information is to be routed.

18. A command router, comprising:

a plurality of external interface packages, each connected to said command router;

a plurality of system application packages, each also connected to said command router;

a plurality of service access points for identifying where a designated network service can be obtained;

a service access point interface for coordinating the communication between said external interface packages, system application packages, and said command router;

a first routing table for correlating external interface packages with a specific service access point; and a second routing table for correlating system application packages with a specific service access point;

wherein said first and second routing tables are dynamically built at runtime.

19. The computer readable storage medium of claim 17 wherein said method further comprises the steps of:

receiving additional first enrollment messages from other commanding devices that have not been enrolled into said enrollment table; and entering routing information contained in said additional first enrollment messages into said enrollment table.

20. The computer readable storage medium of claim 19 wherein said method further comprises the steps of:

receiving a second unenrollment message from an enrolled commanding device; and removing said enrolled commanding device and sending said second unenrollment message from said enrollment table.

21. The computer readable storage medium of claim 17 wherein the method step of entering routing information contained in said first enrollment message into said enrollment table comprises the steps of:
   determining a service access point from which said first enrollment message was received;
   validating said first enrollment message;
   extracting an interface name from said validated first enrollment message; and
   entering said service access point into said enrollment table in a location corresponding to said interface name.

22. The computer readable storage medium of claim 21 wherein said method further comprises the step of sending an error message to a commanded device if said first enrollment message is invalid.

23. The computer readable storage medium of claim 17 wherein said method step of enrolling at least one commanded device comprises:
   receiving a first enrollment message from a commanded device; and
   entering routing information contained in said first enrollment message into said enrollment table.

24. The computer readable storage medium of claim 23 wherein said method further comprises the steps:
   receiving additional first enrollment messages from other commanded devices that have not been enrolled into said enrollment table; and
   entering routing information contained in said additional first enrollment messages into said enrollment table.

25. The computer readable storage medium of claim 24 wherein said method further comprises the steps of:
   receiving a second unenrollment message from an enrolled commanded device; and
   removing said enrolled commanded device and sending said second unenrollment message from said enrollment table.

26. The computer readable storage medium of claim 25 wherein said method further comprises the steps of:
   receiving another first enrollment message from said commanded device that was removed from said enrollment table; and
   entering routing information contained in said additional first enrollment message into said enrollment table.

27. The computer readable storage medium of claim 26 wherein said method further comprises the step of routing information corresponding to said enrolled commanded device corresponding to said another first enrollment message to said enrolled commanding device.

28. The computer readable storage medium of claim 23 wherein said commanded device is a software application supporting system commands and said method step of entering routing information contained in said first enrollment message into said enrollment table comprises the steps of:
   determining a service access point from which said first enrollment message was received;
   validating said first enrollment message;
   extracting a command name from said validated first enrollment message; and
   entering said service access point into said enrollment table in a location corresponding to said command name.

29. The computer readable storage medium of claim 28 wherein said method further comprises the step of sending an error message to said software application if a first enrollment message received from said software application is invalid.

30. The computer readable storage medium of claim 17 wherein said method further comprises the step of sending an acknowledgement message to an enrolled commanding device.

31. The computer readable storage medium of claim 17 wherein said method further comprises the step of sending an acknowledgement message to an enrolled commanded device.

32. The computer readable storage medium of claim 17 wherein said at least one enrollment table comprises a first routing table for enrolling said commanding devices and a second routing table for enrolling said commanded devices.

33. A processor based system routing information between at least one commanding device and at least one commanded device, said processor based system comprising:
   a programmed processor, said programmed processor:
      enrolling at least one commanding device in an at least one enrollment table;
      enrolling at least one commanded device in said enrollment table; and
      using said enrollment table to route information between the enrolled commanding device and the enrolled commanded device;
   wherein said step of enrolling a commanding device comprises:
      receiving a first enrollment message from said commanding device;
      entering routing information contained in said first enrollment message into said enrollment table; and
      determining a service access point from which said first enrollment message was received and entering said service access point in said enrollment table so as to identify the device to which the information is to be routed.

34. The command router of claim 18, further comprising:
   said external interface packages and system application packages communicate by command request messages, wherein each messages contains a header portion and a data portion;
   said header portion further comprising a command name and access ID;
   said data portion further comprising command specific parameters required by the system application packages to execute said command; and
   said command router being command independent.

35. The system of claim 33 wherein said processor:
   receives additional first enrollment messages from other commanding devices that have not been enrolled into said enrollment table; and
   enters routing information contained in said additional first messages into said enrollment table.

36. The system of claim 35 wherein said processor:
   receives a second unenrollment message from an enrolled commanding device; and
   removes said enrolled commanding device and sending said second unenrollment message from said enrollment table.

37. The system of claim 33 wherein said commanding device is an interface external to said processor and said processor enters routing information contained in said first enrollment message into said enrollment table by performing the steps of:

determining a service access point from which said first enrollment message was received from;

validating said first enrollment message;

extracting an interface name from said validated first enrollment message; and entering said service access point into said enrollment table in a location corresponding to said interface name.

38. The system of claim 37 wherein said processor sends an error message to a commanding device if said first enrollment message is invalid.

39. The system of claim 33 wherein said processor enrolls at least one commanded device by performing the steps of:

receiving a first enrollment message from one of said at least commanded device; and entering routing information contained in said first enrollment message into said enrollment table.

40. The system of claim 39 wherein said processor:

receives additional first enrollment messages from other commanded devices that have not been enrolled into said enrollment table; and enters routing information contained in said additional first enrollment messages into said enrollment table.

41. The system of claim 40 wherein said processor:

receives a second unenrollment message from an enrolled commanded device; and removes said enrolled commanded device sending said second unenrollment message from said enrollment table.

42. The system of claim 41 wherein said processor:

receives another first enrollment message from said commanded device that was removed from said enrollment table; and enters routing information contained in said additional first enrollment message into said enrollment table.

43. The system of claim 42 wherein said processor routes information corresponding to said enrolled commanded device corresponding to said another first enrollment message to said enrolled commanding device.

44. The system of claim 39 wherein said commanded device is a software application supporting system commands and said processor enters routing information contained in said first enrollment message into said enrollment table by performing the steps of:

determining a service access point from which said first enrollment message was received;

validating said first enrollment message;

extracting a command name from said validated first enrollment message; and entering said service access point into said enrollment table in a location corresponding to said command name.

45. The system of claim 44 wherein said processor sends an error message to said software application if a first enrollment message received from said software application is invalid.

46. The system of claim 33 wherein said processor sends an acknowledgment message to an enrolled commanding device.

47. The system of claim 33 wherein said processor sends an acknowledgment message to an enrolled commanded device.

48. The system of claim 33 wherein said at least one enrollment table comprises a first routing table for enrolling said commanding devices and a second routing table for enrolling said commanded devices.

49. A method of transmitting a predetermined computer code, said method comprising:

storing said predetermined computer code on a storage device and transmitting said predetermined code from said storage device over a communications link, said predetermined computer code being executable by a processor to perform the functions of:

enrolling at least one commanding device in at least one enrollment table;

enrolling at least one commanded device in said enrollment table; and using said enrollment table to route information between the enrolled commanding device and the controlled commanded device;

wherein said step of enrolling a commanding device comprises:

receiving a first enrollment message from said commanding device;

entering routing information contained in said first enrollment message into said enrollment table; and determining a service access point from which said first enrollment message was received and entering said service access point in said enrollment table so as to identify the device to which the information is to be routed.

* * * * *